(12) United States Patent
Lockwood

(10) Patent No.: US 8,187,471 B2
(45) Date of Patent: May 29, 2012

(54) PRESSURE REGULATOR AND FILTER FOR IRRIGATION SYSTEMS

(75) Inventor: George Henry Lockwood, Pompano Beach, FL (US)

(73) Assignee: Rain Bird Corporation, Azusa, CA (US)

( * ) Notice: Subject to any disclaimer, the term of this patent is extended or adjusted under 35 U.S.C. 154(b) by 363 days.

(21) Appl. No.: 12/633,060

(22) Filed: Dec. 8, 2009

(65) Prior Publication Data

US 2010/0116754 A1    May 13, 2010

Related U.S. Application Data

(60) Division of application No. 11/205,524, filed on Aug. 17, 2005, now Pat. No. 7,628,910, which is a continuation-in-part of application No. 11/088,486, filed on Mar. 24, 2005, now abandoned.

(60) Provisional application No. 60/557,444, filed on Mar. 29, 2004.

(51) Int. Cl.
*B01D 29/62* (2006.01)

(52) U.S. Cl. ........................................ 210/741; 210/791

(58) Field of Classification Search .................. 137/549; 210/413, 414, 106, 741, 791
See application file for complete search history.

(56) References Cited

U.S. PATENT DOCUMENTS

| | | | |
|---|---|---|---|
| 4,081,171 A | 3/1978 | Morgan et al. |
| 4,353,385 A | 10/1982 | Maisch et al. |
| 4,360,037 A | 11/1982 | Kendall |
| 4,671,485 A | 6/1987 | Saarem |
| 5,118,072 A | 6/1992 | Sakamoto et al. |
| 5,996,608 A | 12/1999 | Hunter et al. |
| 6,139,727 A | 10/2000 | Lockwood |
| 6,575,307 B2 | 6/2003 | Lockwood |
| 2006/0131220 A1 | 6/2006 | Lockwood |

*Primary Examiner* — Terry Cecil

(74) *Attorney, Agent, or Firm* — Fitch, Even, Tabin & Flannery, LLP

(57) ABSTRACT

A method of operating an irrigation system includes providing a flow of irrigation water, forming a flow of filtered water by removing particulate matter from the flow of irrigation water by using a filter, and directing a first portion of the flow of filtered water to a control valve. The method also includes directing a second portion of the flow of filtered water to a pressure regulator, delivering a flow of water from the pressure regulator to one or more irrigation devices, and automatically cleaning the surface of a filter upon activation or deactivation of the irrigation system.

20 Claims, 3 Drawing Sheets

PRESSURE REGULATOR AND FILTER FOR IRRIGATION SYSTEMS

CROSS-REFERENCE TO RELATED APPLICATION

This application is a divisional of prior application Ser. No. 11/205,524 now U.S. Pat. No. 7,628,910, filed Aug. 17, 2005, co-pending, which is a continuation-in-part of prior application Ser. No. 11/088,486, filed Mar. 24, 2005, abandoned, which claims benefit of U.S. Provisional Application No. 60/557,444, filed Mar. 29, 2004, which are hereby incorporated herein by reference in their entirety.

FIELD

The present invention generally relates to control devices for use with irrigation systems and, more particularly, to a pressure regulator and filter for an irrigation system.

BACKGROUND

Irrigation systems are used to provide water to a wide variety of devices, including, for example, spray nozzles, sprinkler heads, and drip hoses. Such systems generally make use of control valves to command the flow of water through the system, pressure regulators to even out variations in source water pressure, and filters to remove debris and particulate matter from the water flow.

Solenoid controlled on/off valves for use in irrigation systems are well known. For example, a solenoid-actuated valve uses a solenoid to command a small flow of control water, which, in turn, controls a larger flow of water to attached irrigation devices. Such solenoid-actuated valves often include relatively small passageways for the flow of control water and require the filtering of the control water to insure the removal of particulate matter which could block flow through the relatively small passageways. A filter may be placed upstream to filter the control water stream.

Water filters are also used in a wide range of applications to remove particulate matter from an irrigation water flow stream. Irrigation water supplies may contain fine particulate matter and debris capable of obstructing flow through sprinkler heads or low-flow emitter devices such as drip hoses. Thus, it is necessary to filter the irrigation water supply upstream of attached irrigation devices.

The aggregation of material on the upstream side of a filter can lead to a pressure drop across the filter medium and can significantly reduce water flow through the filter and adversely impact the performance of the irrigation system. Thus, it is also beneficial to be able to clean the filter medium. One known device uses scraper blades to clean the upstream surface of a filter each time the solenoid-actuated valve is opened or closed. Another known device is a self-cleaning filter device which is placed downstream from a control valve. This device filters the irrigation water stream and automatically cleans and back washes a filter on each on and off cycle of an upstream control valve.

Prior irrigation devices provide filters for the irrigation water or for the control water, but not both. Irrigation control devices and filters are generally located in the field, and it can be inconvenient and costly to manually clean the filters and purge them of debris and other particulate matter. Thus, there is a need for an improved self-cleaning filter assembly which cleans a filter on each on and off cycle of a control valve and which filters both the control water for use by a control valve and the irrigation water for use by the irrigation system.

DETAILED DESCRIPTION

Figure 1:
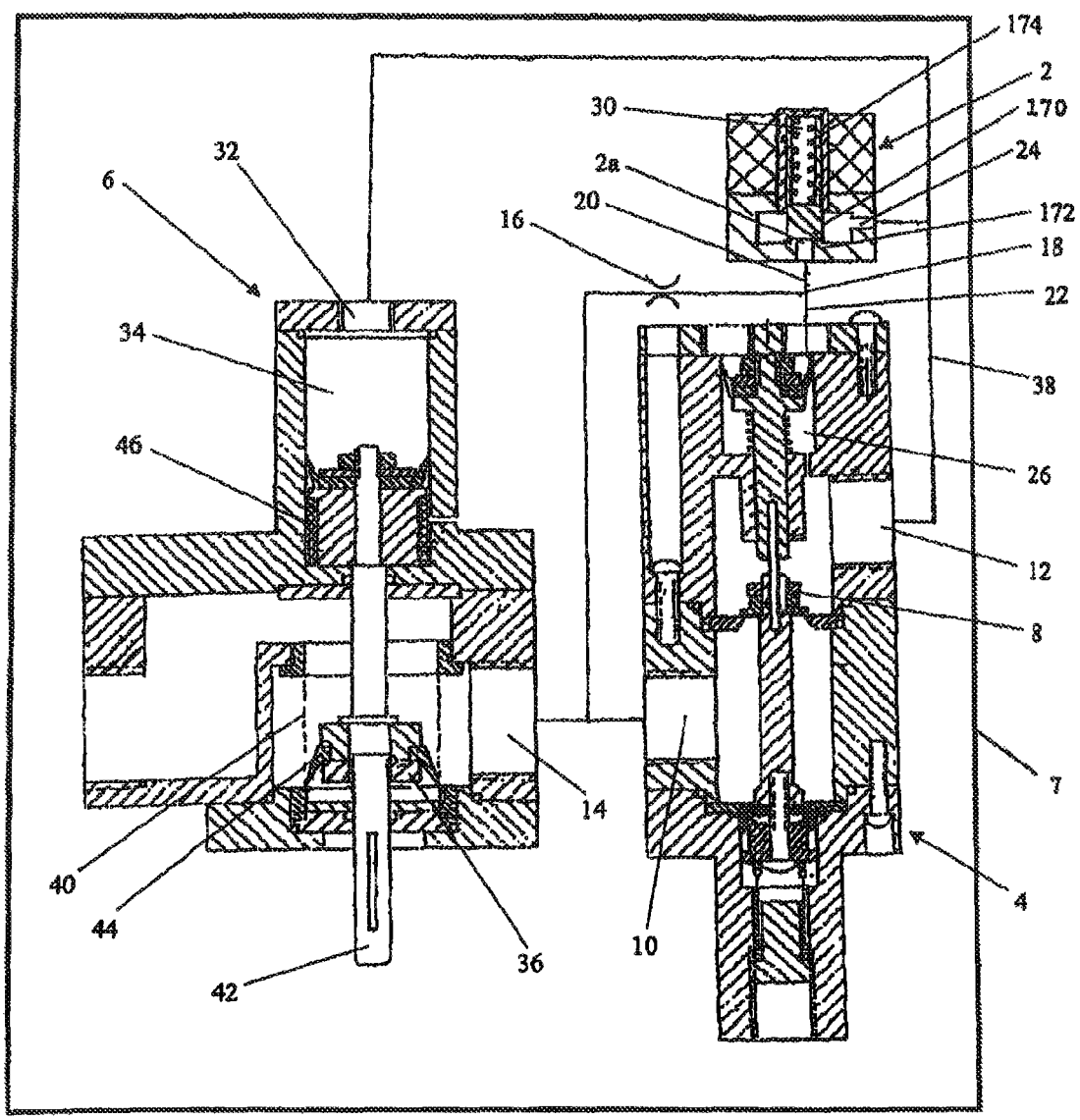
FIG. 1 is a cross-sectional view of a self-cleaning filter, a pressure regulator, and a solenoid-actuated valve embodying features of the present inventions.

With reference to FIG. 1, there is illustrated a solenoid-actuated valve 2, a pressure regulating valve 4, and a self-cleaning filter assembly 6, as an exemplary embodiment employing features in accordance with the present invention. These components are used to control fluid flow, such as water to an irrigation system. The solenoid-actuated valve 2 turns the flow in the irrigation system on or off by controlling a flow valve 8 in the pressure regulating valve 4. The pressure regulating valve 4 maintains water pressure stability between an inlet 10 and an outlet 12 of the valve 4. A self-cleaning filter assembly 6 is located upstream of both the solenoid-actuated valve 2 and the pressure regulating valve 4. Thus, water flow to both the solenoid-actuated valve 2 and the pressure regulating valve 4 is filtered to remove foreign matter that may otherwise interfere with the operation of the solenoid-actuated valve 2, the pressure regulating valve 4 or the irrigation system downstream. Although FIG. 1 illustrates the combination of the self-cleaning filter assembly 6 and the pressure regulating valve 4, other exemplary embodiments may use these components independently and still employ aspects in accordance with the present invention. In one form, the pressure regulator 4, the filter assembly 6, and the valve or control device 2 are incorporated into a single housing 7.

The solenoid-actuated valve 2 is used to control the flow between its on and off state of the irrigation system. The solenoid-actuated valve 2 is located downstream of the filter assembly 6. A portion of the flow of filtered water from the filter assembly outlet 14 is directed to a flow restrictor 16. The flow restrictor 16 limits the flow of filtered water to a very low rate, for example, less than ten gallons/hour. The output of the flow restrictor is directed to a T-connection 18 from which it can flow through passage 20 to the solenoid-actuated valve inlet 2a or through passage 22 to a two-way port 162 of a lockout chamber 26 of the pressure regulating valve 4.

The solenoid-actuated valve 2 includes a plunger valve 170 and a valve seat 172. In the flow "off" condition, the solenoid 30 is de-energized, and a spring 174 biases the plunger valve 170 into engagement with the valve seat 172 to shut off flow through the solenoid-actuated valve 2 between the inlet 2a and the outlet 24. This causes all of the water flowing from the restrictor 16 to flow into the lockout chamber 26. The flow into the lockout chamber 26 causes it to become pressurized, which forces a lockout piston shaft 28 in the chamber 26 to move downward to close the flow valve 8.

In the flow "on" condition, the solenoid 30 is energized to retract the plunger valve 170 and remove it from the valve seat 172 to open the solenoid-actuated valve 2. This allows flow through the solenoid-actuated valve 2 to the outlet 24. A portion of the flow from the solenoid-actuated valve outlet 24 is directed to a two-way port 32 of a control chamber 34 of the self-cleaning filter assembly 6. That flow pressurizes the control chamber 34 and causes the wiper assembly 36 to move to its downward position as described below. The remainder of the flow from the solenoid-actuated valve outlet 24 is directed to the irrigation system via passage 38.

During the normal course of operation, the irrigation system will cycle between flow "off" and flow "on" conditions. The control chamber 34 in the self-cleaning filter assembly 6 acts to operate the wiper assembly 36 to scrape the surface of a filter screen 40, in a manner described below, when the system transitions between the flow "off" and flow "on" conditions. When the irrigation system is switched on, a small flow of control water enters the control chamber 34 through the port 32, pressurizing the chamber 34 and urging a shaft 42 and wiper assembly 36 to a downward position. This movement causes the wiper 44 to scrape accumulated particulate matter from the upstream surface of the filter screen 40. When flow in the system is switched off, control water ceases to flow into the control chamber 34, and so, the control chamber 34 becomes depressurized. This depressurization allows a spring 46 to urge the shaft 42 and wiper assembly 36 into an upward position. This movement causes the wiper 44 to scrape the upstream surface of the filter screen 40 in the opposite direction.

Figure 2:
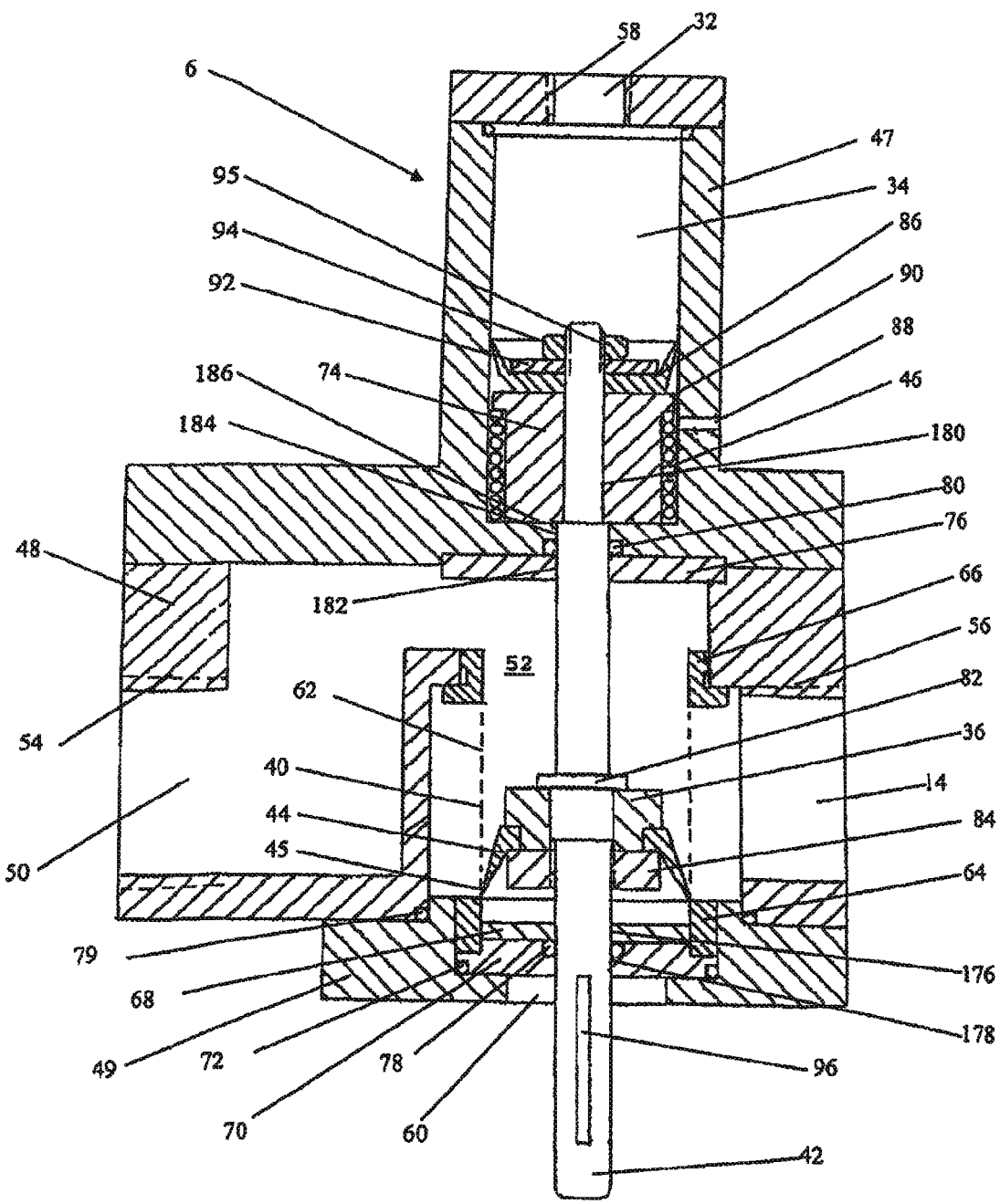
FIG. 2 is a cross-sectional view of the self-cleaning filter assembly of FIG. 1 in the flow on condition.

With reference to FIG. 2, the filter assembly 6 has a drive cylinder 47, a body 48 defining an inlet 50, an outlet 14 and a fluid flow passage 52 extending between the inlet 50 and the outlet 14, and an end cap 49. An o-ring 79 provides a water-tight seal between the body 48 and the end cap 49. The inlet 50 and outlet 14 are designed for connection to piping or other conduit, such as by threads 54 and 56, respectively, or by friction engagements. The fluid flow passage 52 allows water to flow through the filter assembly 6. The filter screen 40 is located in the passage 52 to filter water that flows through the passage 52. The drive cylinder 47 also defines the cylindrical control chamber 34 having the two-way port 32. The port 32 is adapted for connection to a source of control water using threads 58, as shown, or a friction connection. An exit port 60 in the filter assembly end cap 49 allows filtered particulate matter to be discharged from the filter assembly 6 as described below.

The filter screen 40 preferably is comprised of a plastic or metallic material that defines a mesh of openings 62. Although the filter screen 40 may take on many different configurations and shapes, the preferred filter screen has a hollow, generally cylindrical shape. The filter screen 40 includes a lower end support 64 and an upper end support 66 to aid in maintaining the shape of the filter screen 40 and to aid in mounting the filter screen 40 in the filter assembly body 48. The lower end support 64 and the upper end support 66 are preferably comprised of plastic or metallic material.

End cap 49 is suitably attached and sealed to the filter assembly body 48 and locates lower end support 64 and valve plate 70. Valve plate 70 is sealed to the end cap 49 by o-ring 72. A bore 178 in valve plate 70 provides a slideable fit for the shaft 42. O-ring 78 provides a seal between the shaft 42 and the valve plate 70. The washer 68 retains the o-ring 78.

The round shaft 42, capable of reciprocating motion, extends from the control chamber 34 through a hole 180 defined by a spacer 74 in the control chamber 34. The shaft 42 then extends through a hole 182 defined by a top guide plate 76, along a central axis of the filter screen 40, through the hole 176 in the washer 68, and through the hole 178 in the valve plate 70. The lower end of the shaft 42 exits the filter assembly 6 through the valve plate 70 and then the exit port 60 defined by the end cap 49. O-ring 80 provides a water tight seal above the top guide plate 76.

The wiper 44 is fixed on the shaft 42 and reciprocates within the filter screen 40. The wiper 44 preferably has a frusto-conical shape with an annular knife edge formed by its downward-facing, larger diameter edge 45. The outside diameter of the wiper 44 is selected so that the wiper 44 will maintain contact with the filter screen 40 along the entire outside edge 45 of the wiper 44. The wiper 44 preferably is made from a flexible or resilient material. The wiper assembly 36 is fixed to the shaft 42 by means of a stop 82 and a locking nut 84.

The control chamber 34 is used to control the position of the wiper assembly 36 through the development of forces which reciprocate the shaft 42 along its longitudinal axis. The control chamber 34 is preferably in the shape of a cylinder. The central axis of the control chamber 34 is aligned with the central axis of the filter screen 40. A passage 184, sized to receive the shaft 42, connects the control chamber 34 to the fluid flow passage 52. The spring 46 is situated about the spacer 74 and between an upper annular flange 90 of the spacer 74 and a bottom 186 of the control chamber 34. The spring 46 provides an upward biasing force on a piston seal 86 to move the shaft 42 and the wiper 44 upward. The piston seal 86 also transmits hydraulic forces to the shaft 42 when the control chamber 34 is pressurized by a flow of control water to move the wiper 44 in the other direction. The drive cylinder 47 defines a vent hole 88 extending from the control chamber 34 below the piston seal 86 to outside of the filter assembly 6 to atmosphere. The vent hole 88 insures that the pressure beneath the piston seal 86 will remain atmospheric and allows the piston seal 86 to reciprocate in the control chamber 34.

More specifically, the spring 46 has a diameter sized to fit inside the control chamber 34 cylinder and has one end resting on the bottom surface 186 of the control chamber 34. The spacer 74 preferably has a cylindrical shape. The upper annular flange 90 of the spacer 74 rests on the top end of the spring 46. The spring 46 is preferably a helical spring, and the diameter of the cylindrical portion of the spacer 74 is such that it fits inside the spring 46 and provides lateral support for the spring 46 while not impeding axial motion of the spring 46. The diameter of the circular flange 90 is selected so that it is small enough to fit inside the control chamber 34 without causing excessive friction with the sides of the control chamber 34 while being large enough to retain the spring 46. The bias of the spring 46 is chosen so that in the absence of a predetermined hydraulic pressure from above, such as when the system is in a flow off condition, the spring 46 will urge the spacer 74, and thus, the piston seal 86 and shaft 42, to an upward position.

The piston seal 86 is fixed to the shaft 42 above the spacer 74 and is held in place by a mounting washer 92 and a locking nut 94, which may be attached to the shaft 42 by threads 95 along the upper end of the shaft 42. The piston seal 86 provides an essentially watertight seal with the control chamber 34. Hydraulic forces generated by control water flowing into the control chamber 34 through the port 32 when the irrigation system is in a flow "on" condition will urge the piston seal 86 downward against the bias of the spring 46, thereby compressing the spring 46 and causing the shaft 42 to move downward.

Filtered particulate matter is discarded from the filter assembly 6 via one or more grooves 96 defined by the lower region of the shaft 42. The grooves 96 are positioned axially along the shaft 42 so that when the shaft 42 is in its extreme upward position, the grooves 96 reside entirely above the valve plate 70, and the o-ring 98 seals against the shaft 42. When the shaft 42 is in its extreme downward position, the grooves 96 reside entirely below the valve plate 70, and the o-ring 98 again seals against the shaft 42. However, when the shaft 42 is in an intermediate position, such as during the upward or downward stroke of the shaft 42, the grooves 96 bridge the washer 68 and the valve plate 70 and create a passage for the flow of particulate matter and unfiltered water out of the filter assembly 6.

Figure 3:
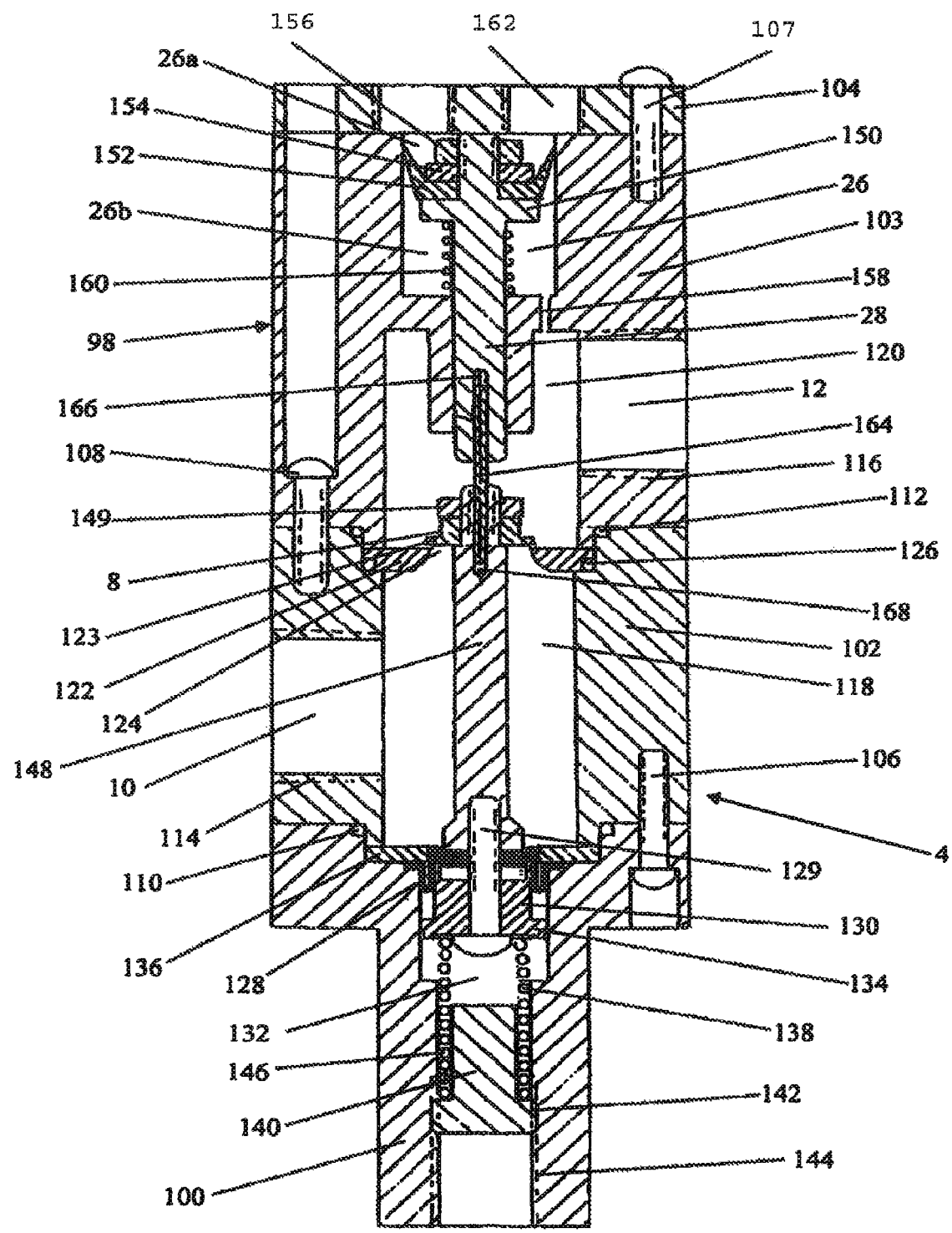
FIG. 3 is a cross-sectional view of the pressure regulator assembly of FIG. 1 in the flow on condition.

With reference to FIG. 3, the pressure regulating valve 4 has a main body 98 defining an inlet 10 and an outlet 12. The main body 98 is preferably constructed in four segments 100, 102, 103 and 104, which may be joined by a number of screws, 106, 107 and 108, and sealed together by o-rings 110 and 112. The inlet 10 and the outlet 12 are designed for connection to piping or other conduit, such as by threads 114 and 116, respectively, or by friction engagements. The pressure regulating valve 4 comprises three main chambers defined by the body 98: a system pressure chamber 118; an outlet chamber 120; and the lockout chamber 26.

The system pressure chamber 118 is separated from the outlet chamber 120 by a valve seat 122 which defines an aperture 124. An o-ring 126 provides a water tight seal between the valve seat 122 and the main body 98. At the opposite end of the system pressure chamber 118 from the valve seat 122, there is a rolling diaphragm 128. The rolling diaphragm 128 is supported in an axially displaceable manner by a spacer 130 which can reciprocate in a spring chamber 132. A flange 134 on the spacer 130, and a bottom plate 136 of the system pressure chamber 118 prevent the upward motion of the spacer 130 into the system pressure chamber 118. The spacer 130 is supported by a spring 138. The spring 138 biases the spacer 130 and rolling diaphragm 128 upward toward the system pressure chamber 118. The amount of spring bias is preselected by the position of an adjustment bolt 140, which can be turned to move the position of the bottom end of the spring 138. The further the adjustment bolt 140 is turned into the main body 48, the greater the spring 138 is pre-loaded and, thus, the greater the spring bias. The adjustment bolt 140 includes a larger diameter threaded portion 142 for engagement with threads 144 on the spring chamber 132 and a smaller diameter portion 146 which fits inside the spring 138. The spring is preferably a helical spring.

A pressure regulator shaft 148 is mounted to the rolling diaphragm 128. A screw 129 fixes the spacer 130 to the pressure regulator shaft 148. The pressure regulator shaft 148 extends through the aperture 124 in the valve seat 122 and into the outlet chamber 120. The flow valve 8 is fixed to the pressure regulator shaft 148 and held in place by a locking nut 149 and includes a valve head 123 sized to seat on the valve seat 122 to seal the aperture 124 when the diaphragm 128 and shaft are in their downward positions designed to prohibit flow through the valve 4. The flow valve head 123 and the rolling diaphragm 128 are sized such that the hydraulic force on the diaphragm 128 generated by the pressure of water in the system pressure chamber 118 will be equal to the opposing upward force on the flow valve head 123.

The function of the pressure regulating valve 4 is to supply, within practical limits, a flow of water at a predetermined constant pressure regardless of the flow rate. The system water supplied to the inlet 10 may be at varying pressures but must be maintained at a higher pressure than the desired pressure at the output 12. Since the water pressure supplied to the system pressure chamber 118 creates equal and opposite forces on the rolling diaphragm 128 and the flow valve head 123, the location of the pressure regulator shaft 148 is determined by the upward force of the spring 138 opposed by the downward hydraulic force of the pressure in the outlet chamber 120 acting on the flow valve head 123. Thus, if the pressure in the outlet chamber 120 decreases for any reason, the downward hydraulic force on the flow valve head 123 decreases and spring 138 will move the pressure regulator shaft 148 upward, causing the flow valve head 123 to open to increase the flow rate sufficiently and restore the pressure in the outlet chamber 120 to the desired value. Conversely, a pressure increase in outlet chamber 120 will cause the downward hydraulic force on the flow valve head 123 to increase and movement of the regulator shaft 148 downward will decrease the flow rate and maintain the desired output pressure.

The flow valve 8 also functions as an on/off valve. A lockout piston shaft 28 extends from the lockout chamber 26 into the outlet chamber 120 and is capable of reciprocating motion. The lockout piston shaft 28 includes an upper annular flange 150 and a piston seal 152. The piston seal 152 may be mounted to the shaft 28 using a washer 154 and a locking nut 156. The piston seal 152 provides an essentially water tight fit with the lockout chamber 26, dividing the chamber 26 into an upper portion 26a above the seal and a lower portion 26b below the seal 152. A vent port 158 provides fluid communication between the lower portion 26b of the lockout chamber 26 and the outlet chamber 120, enabling pressure equalization between the lower portion 26b of the lockout chamber 26 and the outlet chamber 120.

The pressure of the control water in the upper portion 26a of the lockout chamber 26 determines the position of the lockout piston shaft 28. The lockout piston shaft 28 is biased towards an upward position by a lockout spring 160. The preferred lockout spring 160 is a helical spring that surrounds a portion the lockout piston shaft 28. One end of the lockout spring 160 rests against the bottom surface 27 of the lockout chamber 28 and the other end presses against the upper annular flange 150 of the lockout piston shaft 28.

When the solenoid-actuated valve 2 is open, control water can flow freely through the solenoid-actuated valve 2 to join the flow from the outlet chamber 120 via the passage 38, and to the port 162 of the lockout chamber 26 via the passage 22. Thus, the control water supplied to the port 162 of the lockout chamber will essentially be at the same pressure as the outlet water pressure. In this situation, the net hydraulic force on the lockout piston seal 152 will be zero, and the bias of the spring 160 will hold the lockout piston shaft 28 in an upward position.

When the solenoid-actuated valve 2 is closed, the entire flow of control water from the restrictor 16 is directed into the lockout chamber 26 via the port 162. This flow pressurizes the upper portion 26a of the lockout chamber 26, forcing the lockout piston shaft 28 downward.

The lockout piston shaft 28 is linked to the pressure regulator shaft 148 by a slideable pin 164. The bottom portion of the lockout piston 28 and the top portion of the pressure regulator shaft 148 have central axial bores 166 and 168 aligned with each other and sized to receive the slideable pin 164. The depth of the bores 166 and 168 and the length of the slideable pin 164 are determined so as to allow vertical play when the lockout piston shaft 28 is in its extreme upward position, so that the regulator 4 can control the pressure in the outlet chamber 120 by varying the spacing between the valve head 123 and the valve seat 122. More specifically, when the solenoid-actuated valve 2 is open and the system is in a flow "on" condition, the lockout piston shaft 28 is in an upward position, and the vertical play in the slideable pin 164 allows the pressure regulator shaft 148 to move freely in conjunction with the rolling diaphragm 128. This allows the flow valve 8 to function as a pressure regulating valve. The pin 164 also allows the lockout piston shaft 28 to move downward and engage the pressure regulator shaft 148 until the flow valve 8 closes off when then lockout piston shaft 28 moves to an extreme downward position. The slideable pin 164 is sufficiently long so as to remain engaged in the bores 166 and 168 of both the lockout piston shaft 28 and the pressure regulator shaft 148 at all times during operation of the pressure regulator 4.

When the solenoid-actuated valve 2 is closed, the system is in a flow "off" condition and the upper portion 26a of the lockout chamber 26 will be pressurized, forcing the lockout piston shaft 28 to a downward position. In this condition, the slideable pin 164 is forced against the pressure regulating shaft 148, causing the flow valve 8 to close and shut off flow to the irrigation system.

The foregoing relates to a preferred exemplary embodiment of the invention. It is understood that other embodiments and variants are possible which lie within the spirit and scope of the invention as set forth in the following claims.

What is claimed is:

1. A method of operating an irrigation system comprising:
providing a flow of irrigation water;
forming a flow of filtered water by removing particulate matter from the flow of irrigation water by using a filter;
directing a first portion of the flow of filtered water to a control valve;
directing a second portion of the flow of filtered water to a pressure regulator;
delivering a flow of water from the pressure regulator to one or more irrigation devices; and
automatically cleaning the surface of the filter upon activation or deactivation of the irrigation system.

2. The method of claim 1 comprising using a flow of filtered water from the control valve to cause a scraper to scrape across a surface of the filter when the control valve is opened.

3. The method of claim 2 comprising reducing water flow to the filter and closing the pressure regulator while causing the scraper to scrape across the filter in a first direction to clean the filter.

4. The method of claim 3 comprising increasing the water flow to the filter and permitting the pressure regulator to regulate flow while causing the scraper to scrape across the filter in a second direction to clean the filter.

5. The method of claim 2 comprising discarding filtered particulate material during a stroke of the scraper.

6. The method of claim 1 comprising controlling the opening and closing of the pressure regulator by operation of the control valve.

7. The method of claim 1 wherein the control valve is solenoid-actuated.

8. The method of claim 1 comprising arranging the filter so that substantially all water flow provided to the irrigation system flows through the filter.

9. The method of claim 1 comprising providing the pressure regulator, the filter, and the control valve in a single housing.

10. The method of claim 1 comprising controlling the water flow through the pressure regulator including:
operating the control valve in a first setting to close the pressure regulator by directing water flow to maintain a valve member against a valve seat within the pressure regulator and to a second alternative setting that permits the valve member to reciprocate on and off of the valve seat; and
operating a regulator valve within the pressure regulator to move the valve member on and off of the valve seat when the control valve is in the second alternative setting and depending on the fluid pressure of the flow at the regulator valve.

11. The method of claim 10 wherein operating the control valve and regulator valve comprises axially reciprocating a shaft of the valve member relative to a piston positioned by the control valve.

12. The method of claim 11 wherein the piston is disposed coaxially to the shaft and wherein a pin reciprocally connects the shaft to the piston.

13. The method of claim 1 wherein the filter is disposed in a filter assembly, and the method comprising:
operating the control valve to control the flow of irrigation water from the control valve to a control chamber on the filter assembly;
moving a piston in the control chamber and with a shaft extending into a separate flow path defined by the filter assembly providing the irrigation water to the pressure regulator; and
reciprocating a scraper attached to the shaft and against the filter.

14. The method of claim 13 comprising discharging foreign matter removed from the filter and through an opening on the shaft.

15. The method of claim 14 comprising discharging the foreign matter from the filter assembly by extending a portion of the shaft with the opening through a hole on a wall of the filter assembly forming the fluid flow path.

16. The method of claim 14 wherein the opening is an elongated groove extending longitudinally along the shaft.

17. The method of claim 16 comprising discharging the foreign matter while the groove simultaneously extends within the filter assembly and outside of the fluid flow path.

18. A method for controlling and filtering fluid flow comprising:
operating a control device to control the flow of fluid from the control device to a filter assembly to move a piston in the filter assembly;
reciprocating a scraper interconnected to the piston and against a filter disposed within a fluid flow path defined by the filter assembly and separated from the piston to clean the filter; and
discharging material wiped from the filter and through an opening on a shaft holding the scraper and connected to the piston.

19. The method of claim 18 wherein moving the piston comprises applying a spring bias force on the piston in a direction opposite a hydraulic force exerted on the piston from the fluid from the control device and in a control chamber on the filter assembly that is distinct from the fluid flow path.

20. The method of claim 18 comprising operating the control device in a first setting causing the piston to move and the scraper to wipe across the filter in a first direction to clean the filter element, and in a second setting prohibiting fluid from flowing to the filter assembly from the control device causing the scraper to wipe back across the filter in a second direction to clean the filter element.

* * * * *